(12) United States Patent
Usami et al.

(10) Patent No.: US 8,476,892 B2
(45) Date of Patent: Jul. 2, 2013

(54) CORE RECOGNITION SYSTEM AND CORE RECOGNITION METHOD

(75) Inventors: Mitsuo Usami, Tachikawa (JP); Ryosuke Shigemi, Hitachi (JP)

(73) Assignee: Hitachi-GE Nuclear Energy, Ltd., Hitachi-shi (JP)

(*) Notice: Subject to any disclaimer, the term of this patent is extended or adjusted under 35 U.S.C. 154(b) by 355 days.

(21) Appl. No.: 12/951,980

(22) Filed: Nov. 22, 2010

(65) Prior Publication Data

US 2011/0204871 A1    Aug. 25, 2011

(30) Foreign Application Priority Data

Feb. 19, 2010   (JP) ................................. 2010-034182

(51) Int. Cl.
   *G01R 19/00*   (2006.01)
   *G01R 25/00*   (2006.01)

(52) U.S. Cl.
   USPC ........................... 324/66; 324/76.77; 324/683

(58) Field of Classification Search
   None
   See application file for complete search history.

(56) References Cited

U.S. PATENT DOCUMENTS

| 7,061,083 | B1 | 6/2006 | Usami et al. |
| 7,717,349 | B2 * | 5/2010 | Akiyama et al. ............... 235/492 |
| 2009/0140300 | A1 | 6/2009 | Usami |
| 2011/0220724 | A1 * | 9/2011 | Sakama ......................... 235/492 |

FOREIGN PATENT DOCUMENTS

| JP | 5-180892 A | 7/1993 |
| JP | 2000-338160 A | 12/2000 |
| JP | 2006-243834 A | 9/2006 |
| WO | WO 2007/013152 A1 | 2/2007 |

* cited by examiner

*Primary Examiner* — Melissa Koval
*Assistant Examiner* — Trung Nguyen
(74) *Attorney, Agent, or Firm* — Crowell & Moring LLP

(57) ABSTRACT

An object of the invention is to prevent a human error, greatly reducing man-hours and to securely identify a core. To achieve the object, a request for a serial number is first made via a conductor of a core from a recognition unit that functions as a master to a recognition unit that functions as a slave. Next, the recognition unit as the slave reads a serial number for an IC tag and transmits the serial number via the conductor of the core. The recognition unit as the master receives the serial number transmitted from the recognition unit as the slave and collates the serial number and a serial number stored in an IC tag. It is ascertained by the collation that the conduction of the core is correctly made and it is displayed on a display of the recognition unit as the master and others that no disconnection on the way and no error in selecting an end of wiring are caused.

5 Claims, 8 Drawing Sheets

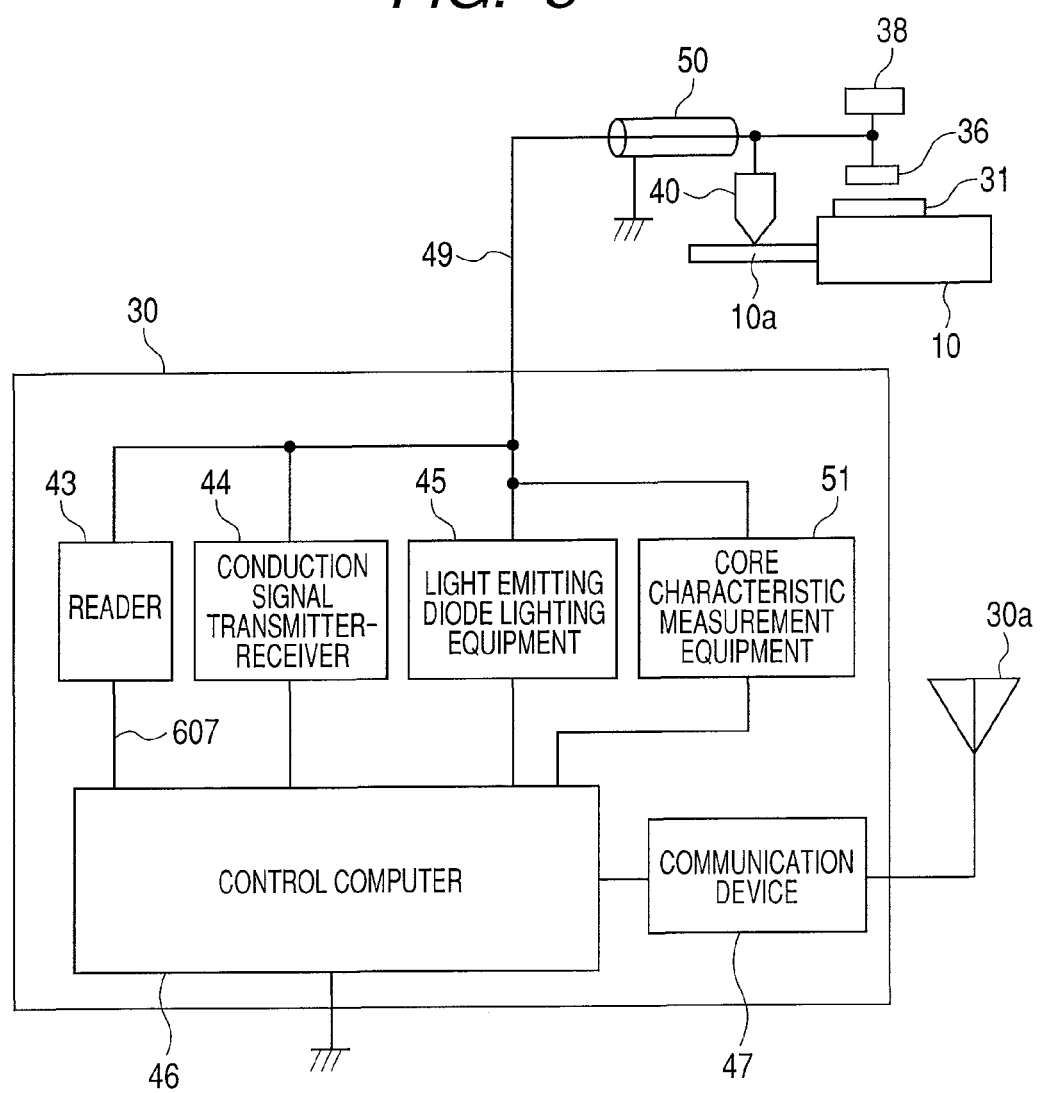

CORE RECOGNITION SYSTEM AND CORE RECOGNITION METHOD

CLAIM OF PRIORITY

The present application claims priority from Japanese patent application JP 2010-034182 filed on Feb. 19, 2010, the content of which is hereby incorporated by reference into this application.

FIELD OF THE INVENTION

The present invention relates to technique for preventing an error in connecting a core, particularly relates to technique effective in identifying an arbitrary core of multiple ones.

BACKGROUND OF THE INVENTION

Multiple cores are used in a nuclear power station, a thermal power station, a control center, a data center, a huge building and others, and the disconnection and the reconnection of a core are ordinarily performed for regular maintenance, the repair, the dismantlement and the installation of a device and others.

As such work has intricate and individual specifications, it has to depend on individual human power and is exposed to a risk of a human error. Strict countermeasures for preventing a human error have been taken using plural check systems; however, even if considerable man-hours are expended for the countermeasures, the countermeasures are not complete.

For this type of core check technique, there are known technique that identification data at a transmitting end is transmitted via a core after the connection of the core and the received identification data and stored identification data at a receiving end are compared (for example, refer to Japanese Unexamined Patent Application Publication No. 2000-338160), technique that the conduction of each conductor is checked by applying a separate identifying signal to each conductor of plural cores and detecting the identifying signal at the other end (for example, refer to Japanese Unexamined Patent Application Publication No. Hei5 (1993)-180892) and technique that an IC tag is attached to both ends of a core, both identification information is compared at the other end and it is discriminated whether both identification information is that of the same core or not (for example, refer to Japanese Unexamined Patent Application Publication No. 2006-243834).

SUMMARY OF THE INVENTION

However, it is found by this inventor that the above-mentioned techniques for checking the connection of the core have the following problems.

For example, in the techniques disclosed in Japanese Unexamined Patent Application Publication No. 2000-338160 and Japanese Unexamined Patent Application Publication No. Hei5 (1993)-180892, the identification is made by transmitting identification data to the connected core as described above, however, the techniques have a problem that when a connecting location of the core is off, no error can be detected.

Besides, the technique disclosed in Japanese Unexamined Patent Application Publication No. 2006-243834 has a problem that as the selection of the core in reading depends on human power though the IC tags are adopted, a new human error may be caused.

An object of the invention is to provide technique that enables preventing a human error, greatly reducing man-hours and securely identifying a core.

The above-mentioned object, another object and new characteristics of the invention will be clarified from the description of this specification and attached drawings.

The brief description of a summary of a representative of inventions disclosed in this application is as follows.

In the invention, an IC tag more excellent in readability and more compact, compared with a bar code is attached to both ends of a core and a recognition unit provided with a terminal for reading the IC tag and a terminal for connecting a conductor of the core is set at both ends of the target core.

It is general that plural cores are used and the same type of recognition units are connected to the plural cores at random. The core is identified by exchanging serial numbers in mutual IC tags via a conductor of the core.

In detail, the core is identified by activating the recognition unit in the vicinity of the core at one end and instructing the recognition unit at the remote other end to read a serial number in the IC tag via the conductor of the core. Afterward, the remote recognition unit reads the serial number and transmits it. The recognition unit in the vicinity at one end compares the respective serial numbers, that is, the serial numbers in the vicinity and at a remote location and can identify the core.

A summary of the other invention of this application will be briefly described below.

In the invention, a first IC tag which is attached to one end of a core and in which arbitrary recognition information is stored, a first recognition unit that reads the recognition information stored in the first IC tag, a second IC tag which is attached to the other end of the core and in which arbitrary recognition information is stored and a second recognition unit that reads the recognition information stored in the second IC tag are provided, the first recognition unit is provided with a first antenna that receives a radio wave from the first recognition unit and transmits it to the first IC tag and a first conductor connecting terminal electrically connected to one end of a conductor of the core, the second recognition unit is provided with a second antenna that receives a radio wave from the second recognition unit and transmits it to the second IC tag and a second conductor connecting terminal electrically connected to the other end of the conductor of the core, the first recognition unit requests the second recognition unit to read recognition information stored in the second IC tag via the conductor of the core, acquires the recognition information read by the second recognition unit via the conductor of the core, compares the acquired recognition information and recognition information read by the first recognition unit and stored in the first IC tag, and the first recognition unit judges that when each recognition information coincides, the core is in a conductive state.

Besides, the invention relates to a core recognition method of reading recognition information from a first IC tag attached to one end of a core by a first recognition unit, reading recognition information from a second IC tag attached to the other end of the core by a second recognition unit and transmitting the recognition information via the core, comparing the transmitted recognition information and the recognition information in the first IC tag read by the first recognition unit and determining that the conduction of the core is correctly identified when each recognition information coincides.

The brief description of effects acquired by the representatives of the inventions disclosed in this application is as follows.

(1) A core can be automatically identified without an error even if the other end of the core is remote from one end of the core.

(2) Beside, an error in connecting a different core though it is similar can be prevented because the core is checked in the linkage of a conductor of the core and the IC tag.

BRIEF DESCRIPTION OF THE DRAWINGS

FIG. 8 is a schematic diagram showing another example of the recognition unit shown in FIG. 7.

DETAILED DESCRIPTION OF THE PREFERRED EMBODIMENTS

Figure 1:
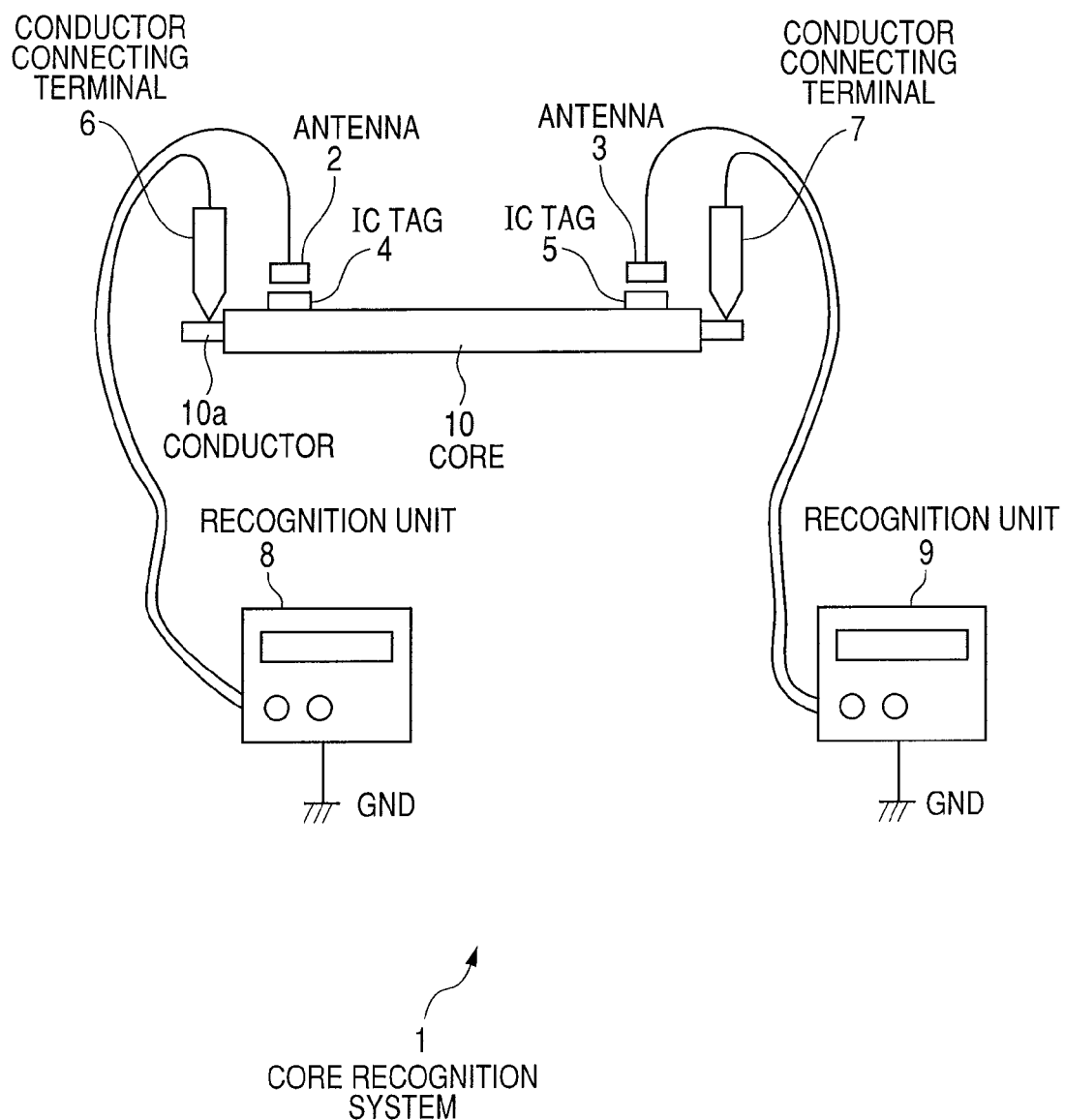
FIG. 1 is a schematic diagram showing one example of a core recognition system disclosed in a first embodiment of the invention.

Referring to the drawings, embodiments of the invention will be described in detail below. In all the drawings for explaining the embodiments, the same reference numeral is allocated to the same member in principle and its repeated explanation is omitted.

First Embodiment

Figure 2:
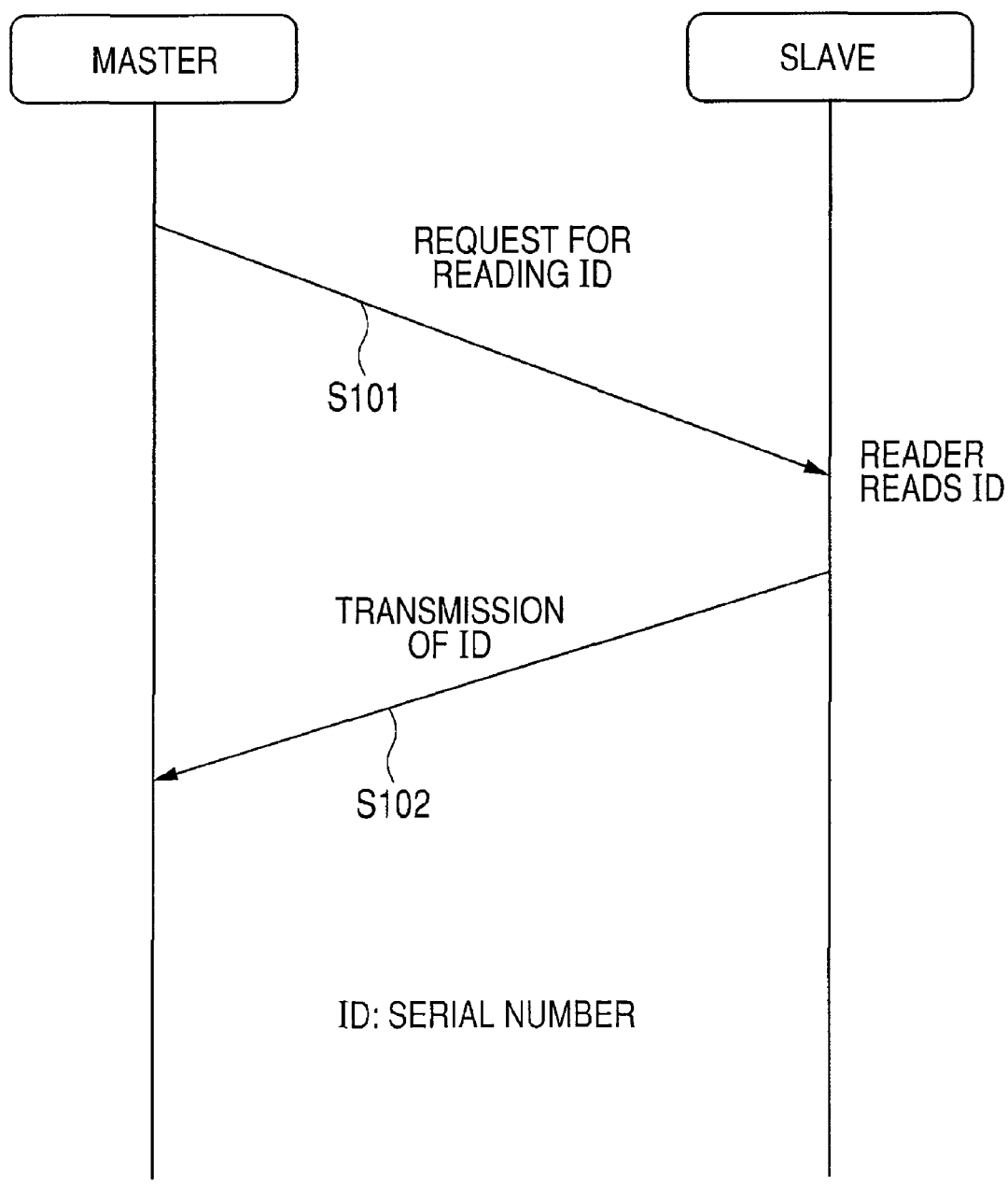
FIG. 2 is a schematic diagram showing one example of data transition in the core recognition system shown in FIG. 1.
Figure 3:
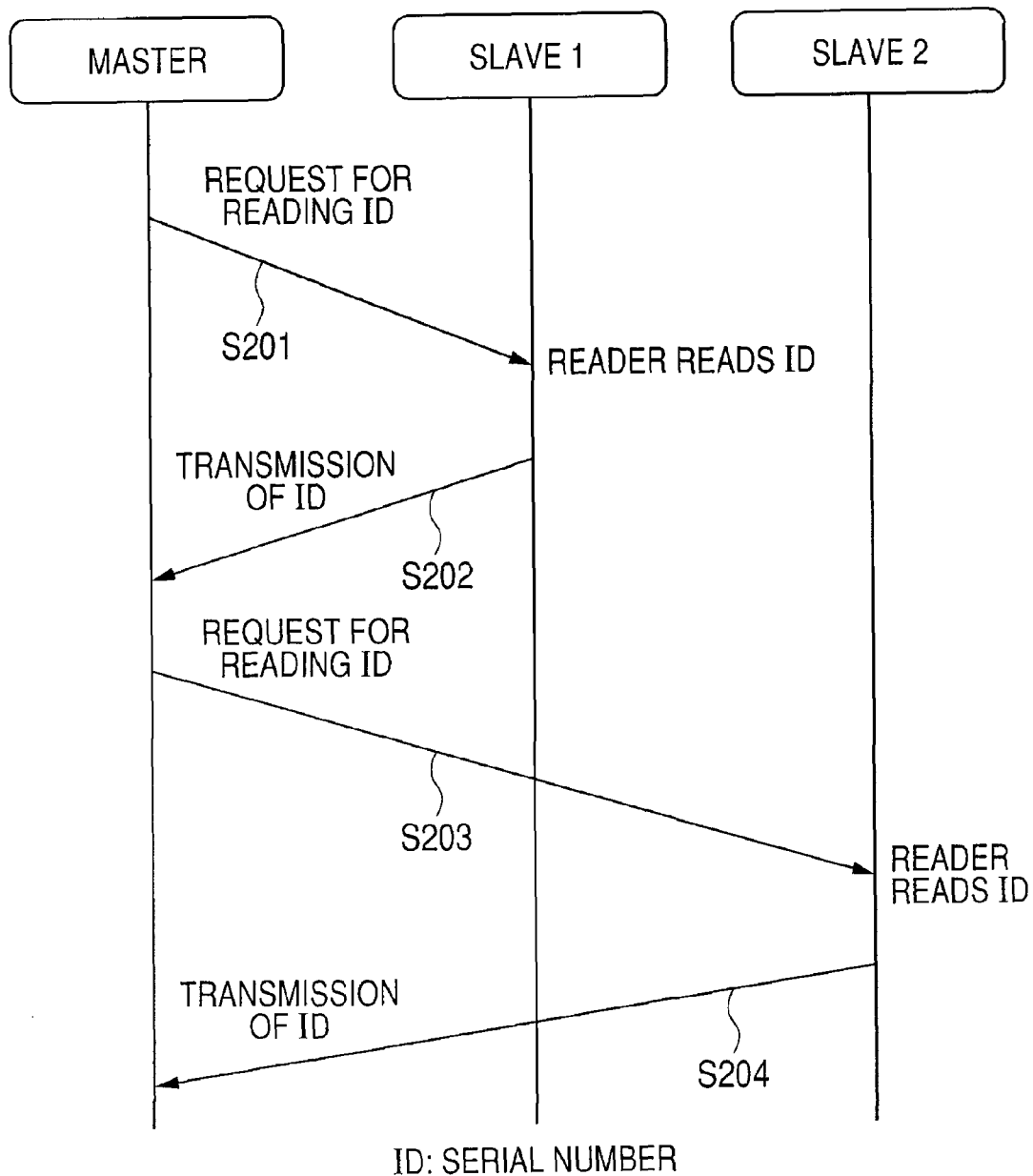
FIG. 3 is a schematic diagram showing another example of data transition in the core recognition system shown in FIG. 1.
Figure 4:
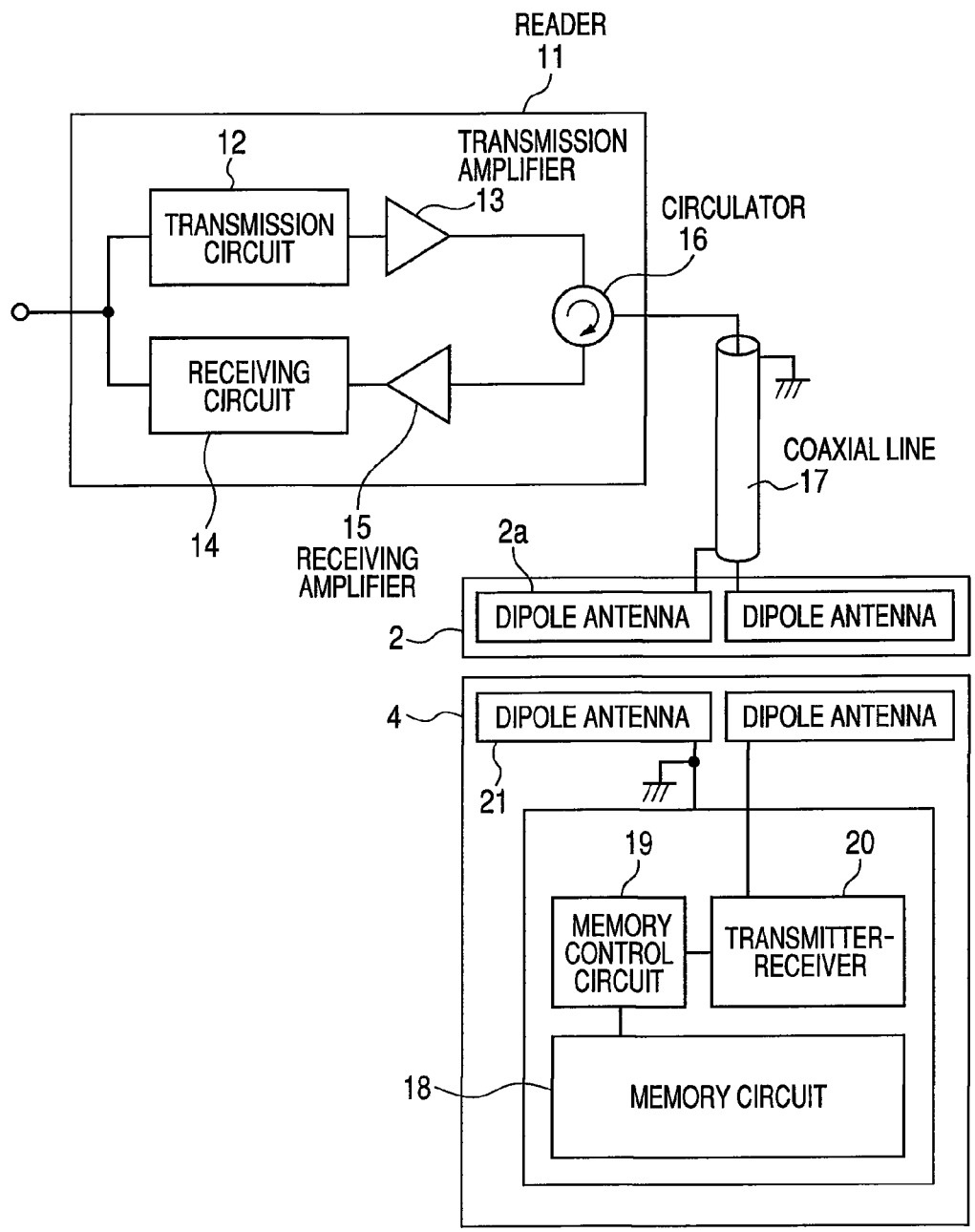
FIG. 4 is a schematic diagram showing one example of the configuration of an IC tag, an antenna and a reader provided to a recognition unit respectively in the core recognition system shown in FIG. 1.
Figure 5:
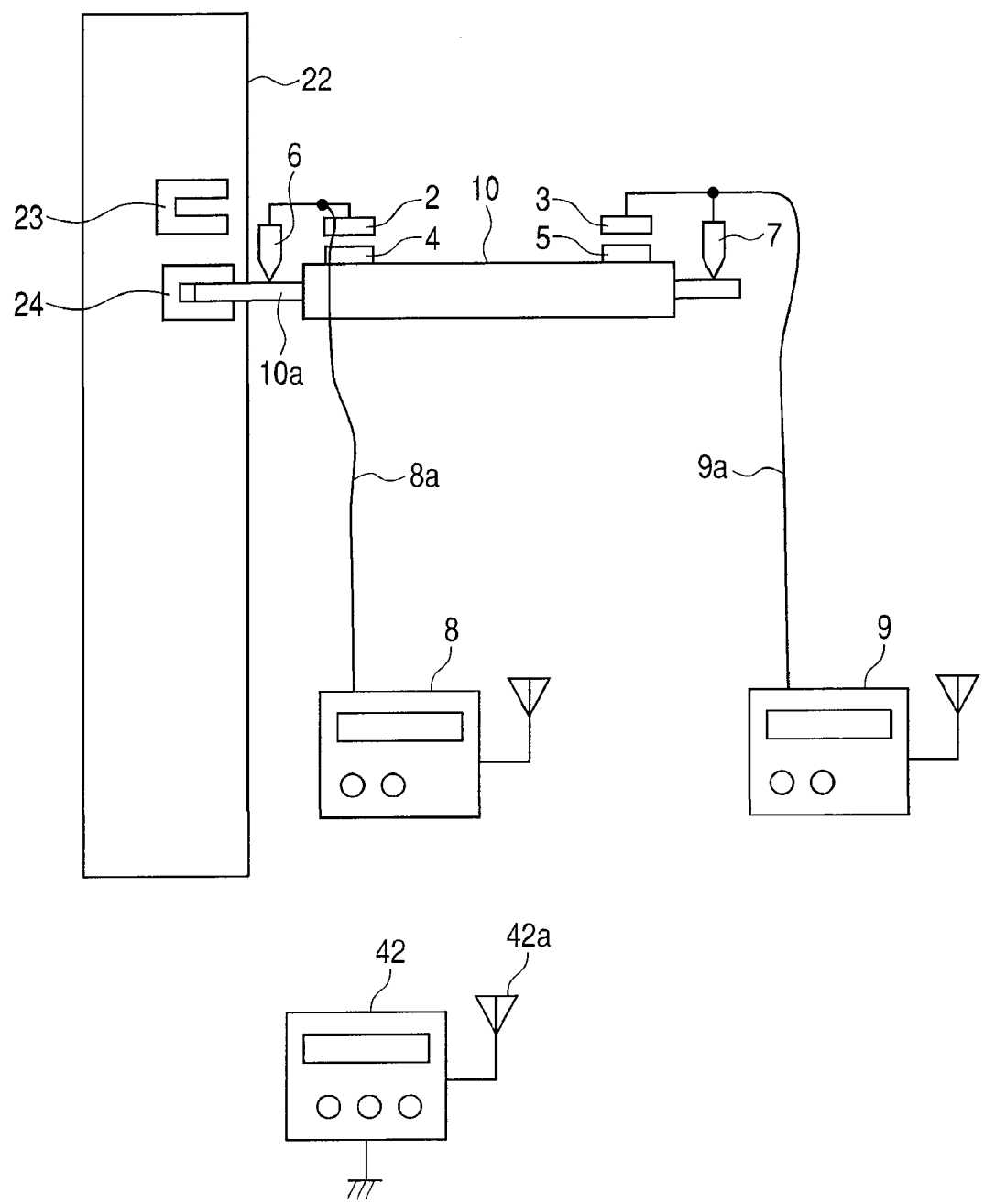
FIG. 5 is a schematic diagram showing one example of the identification of a core by the core recognition system shown in FIG. 1 in a state in which the core is connected to a terminal block of a terminal board.

FIG. 1 is a schematic diagram showing one example of a core recognition system disclosed in a first embodiment of the invention, FIG. 2 is a schematic diagram showing one example of data transition in the core recognition system shown in FIG. 1, FIG. 3 is a schematic diagram showing another example of data transition in the core recognition system shown in FIG. 1, FIG. 4 is a schematic diagram showing one example of the configuration of an IC tag, an antenna and a reader provided to a recognition unit respectively in the core recognition system shown in FIG. 1, and FIG. 5 is a schematic diagram showing one example of the identification of a core by the core recognition system shown in FIG. 1 in a state in which the core is connected to a terminal block of a terminal board.

In the first embodiment, the core recognition system 1 is a system that recognizes an arbitrary core of multiple ones. The core recognition system 1 is configured by the antennas 2, 3, the IC tags 4, 5, conductor connecting terminals 6, 7 and recognition units 8, 9 as shown in FIG. 1.

Each IC tag 4, 5 is configured by an IC chip and an antenna for example, a serial number (ID) and others are stored in the IC chip, and the serial number is read by a reader 11 shown in FIG. 4 and described later via radiocommunication.

The IC tag 4 to be a first IC tag is attached to one end of the core 10 and the IC tag 5 to be a second IC tag is attached to the other end of the core 10. The antenna 2 which is a first antenna is provided to read the serial number stored in the IC tag 4. The antenna 3 to be a second antenna is provided to read the serial number stored in the IC tag 5.

The conductor connecting terminals 6, 7 are connected to a conductor 10a of the core 10, the conductor connecting terminal 6 to be a first conductor connecting terminal is connected to one end of the conductor 10a of the core 10, and the conductor connecting terminal 7 to be a second conductor connecting terminal is connected to the other end of the conductor 10a of the core 10.

The antenna 2 and the conductor connecting terminal 6 are connected to the recognition unit 8 to be a first recognition unit, and the antenna 3 and the conductor connecting terminal 7 are connected to the recognition unit 9 to be a second recognition unit. These recognition units 8, 9 contribute to determining whether the core 10 is the same or not.

Besides, the recognition units 8, 9 are grounded. Ground GND may be also a grounding terminal held by a building and is required to enable data transmission to a remote device via spread cores with one conductor of a core.

The conductor 10a of the core 10 is utilized for a common line for linking with the recognition units 8, 9. That is, one recognition unit 8 (or the recognition unit 9) requests the other recognition unit 9 (or the recognition unit 8) to transmit data and transmits read data to the other recognition unit.

Accordingly, as recognition is performed via each IC tag 4, 5, it can be correctly determined which core is currently selected and a conduction test can be correctly made. Generally, the same recognition units do not prevent having plural antennas and plural conductor connecting terminals.

FIG. 2 is the schematic diagram showing one example of data transition in the core recognition system 1 disclosed in the first embodiment.

In this case, the recognition units share roles as a master and a slave and the recognition unit to be the master considers so that the whole system is operated with the initiative. In this case, the recognition unit 8 functions as the master and the recognition unit 9 functions as the slave.

First, a request for a serial number is made via the conductor 10a of the core 10 from the recognition unit 8 (described as the master in FIG. 2) which is the master to the recognition unit 9 (described as the slave in FIG. 2) which is the slave (a step S101). The recognition unit 9 reads the serial number via the IC tag 5 and transmits the serial number via the conductor 10a of the core 10 (a step S102).

The recognition unit 8 receives the serial number transmitted from the recognition unit 9 and collates the serial number and a serial number stored in the IC tag 4. Or the recognition unit 8 may also collate the received serial number with a number in a database registered in the recognition unit 8 beforehand.

It is ascertained by the collation that the conduction of the core 10 is correctly performed and it is displayed on a display and others of the recognition unit 8 that there is no disconnection on the way and no error of the selection at an end of wiring. As the recognition unit 9 is not operated and transmits no serial number to the recognition unit 8 when no selection is made by the recognition unit 9, the recognition unit 8 judges that no response is made because of time out and displays it on the display and others of the recognition unit 8.

FIG. 3 is the schematic diagram showing another example of data transition in the core recognition system 1 disclosed in the first embodiment. In FIG. 3, two cores 10 are cascaded and FIG. 3 shows data transition among one recognition unit 8 (described as the master in FIG. 3) which is the master and recognition units 9 (described as a slave 1 and a slave 2 in FIG. 3) to be two (plural) slaves.

As for the connecting configuration of the recognition units 8, 9 in this case, the recognition unit 8 as the master is connected to one terminal area of the first core 10, the recognition unit 9 as the first slave is connected to the other terminal area of the first core 10, and the recognition unit 9 is connected to one terminal area of the second core 10 (the cascaded core). The recognition unit 9 as the second slave is connected to the other terminal area of the second core 10.

First, as shown in FIG. 3, a request for a serial number is made via a conductor 10a of the first core 10 from the recognition unit 8 as the master to the first recognition unit 9 (a step S201). The first recognition unit 9 reads the serial number in an IC tag 5 attached to the first core 10 and transmits the serial number via the conductor 10a of the core 10 (a step S202).

When the recognition unit 8 receives the serial number transmitted from the first recognition unit 9, it reads in a serial number in an IC tag 4 attached to the core 10 and collates the serial number and the received serial number.

Next, the recognition unit 8 requests the second recognition unit 9 to read a serial number via a conductor 10a of the second core 10 (a step S203). The second recognition unit reads the serial number from an IC tag attached to the other end of the cascaded core 10 and transmits the serial number via the conductor 10a of the core 10 (a step S204).

The recognition unit 8 receives the serial number transmitted from the second recognition unit 9, reads the serial number in the IC tag 4 attached to the core 10, and the recognition unit 8 collates the serial number and the received serial number. Or the recognition unit 8 may also collate the serial number with a number in a database registered beforehand.

It is ascertained by these double collation that the conduction of the core is correctly performed and it is displayed on the display of the recognition unit 8 and others that no disconnection on the way and no error in selection at an end of wiring are caused.

FIG. 4 is the schematic diagram showing one example of the configuration of the IC tag 4, the antenna 2 and the reader 11 provided to the recognition unit 8 respectively in the core recognition system 1 shown in FIG. 1.

The reader 11 reads data stored in the IC tag 4. The reader 11 is configured by a transmission circuit 12, a transmission amplifier 13, a receiving circuit 14, a receiving amplifier 15 and a circulator 16.

The transmission amplifier 13 is connected to the transmission circuit 12 and the receiving amplifier 15 is connected to the receiving circuit 14. Besides, the circulator 16 is connected to an output terminal of the transmission amplifier 13 and an input terminal of the receiving amplifier 15.

The circulator 16 is provided with a function for separating a signal from the antenna 2 into a traveling wave and a reflected wave. The antenna 2 is configured by a dipole antenna 2a for example. The circulator 16 and the dipole antenna 2a are connected via a coaxial line 17.

The IC tag 4 is configured by a memory circuit 18, a memory control circuit 19, a transmitter-receiver 20 and a dipole antenna 21.

The transmitter-receiver 20 is connected to the dipole antenna 21 and the memory control circuit 19 is connected to the transmitter-receiver 20. Further, the memory circuit 18 is connected to the memory control circuit 19.

When radio energy from the antenna 2 is received by the dipole antenna 21, the energy is converted to voltage and the transmitter-receiver 20 is operated. The memory control circuit 19 efficiently makes control for serially reading data such as a serial number stored in the memory circuit 18. Serial numbers and the other data are stored in the memory circuit 18.

The dipole antenna 2a and the dipole antenna 21 efficiently perform coupling when each length is equal to or below 10 mm for example. The transmission circuit 12 of the reader 11 generates a high-frequency signal by modulating a clock pulse.

In this case, it is efficient for the compact dipole antenna that a frequency band is between approximately 950 MHz and approximately 2450 MHz for example. As a reflection coefficient varies when the impedance of the dipole antenna 21 is varied by the output of the IC tag 4, the reader 11 can receive data.

Next, technique for identifying the core using the core recognition system 1 in a state in which the core 10 is connected to the terminal block of the terminal board will be described referring to FIG. 5.

In this case, as shown in FIG. 5, terminal blocks 23, 24 are provided to the terminal board 22. The IC tag 4 is attached to one end of the core 10 and the IC tag 5 is attached to the other end of the core 10.

The antenna 2 reads a serial number stored in the IC tag 4 and the antenna 3 reads a serial number stored in the IC tag 5. The conductor connecting terminal 6 is connected to one end of the conductor 10a of the core 10 and the conductor connecting terminal 7 is connected to the other end of the conductor 10a of the core 10.

The antenna 2 and the conductor connecting terminal 6 are connected to a connecting line 8a connected to the recognition unit 8 in common, and the antenna 3 and the conductor connecting terminal 7 are connected to a connecting line 9a connected to the recognition unit 9 in common.

A controller 42 that functions as a control unit communicates with the recognition units 8, 9 via an antenna 42a by radio and controls the operation of the recognition units 8, 9. One end of the core 10 is connected to the terminal block 24 of the terminal board 22. The terminal board 22 functions as a connection with another device and electronic equipment such as a computer is connected to the terminal board.

As described above, when equipment such as a computer is connected to the terminal board 22, voltage in energizing is dropped at a low signal level at which the voltage does not impedes another equipment such as a computer. In consideration of the facility of demodulation, a signal using a low-potential high-frequency band for a carrier is used.

Hereby, the core can be identified without damaging electronic equipment such as a computer in a state in which the core 10 is connected to the terminal board 22.

The operation of the recognition units 8, 9 is similar to that shown in FIG. 2 and it is different in that the operation is made under control by the controller 42 by radiocommunication.

Thereby, according to the first embodiment, as the arbitrary core is identified based upon serial numbers in the mutual IC tags 4, 5 via the conductor of the core, the core can be automatically unerringly identified.

Second Embodiment

Figure 6:
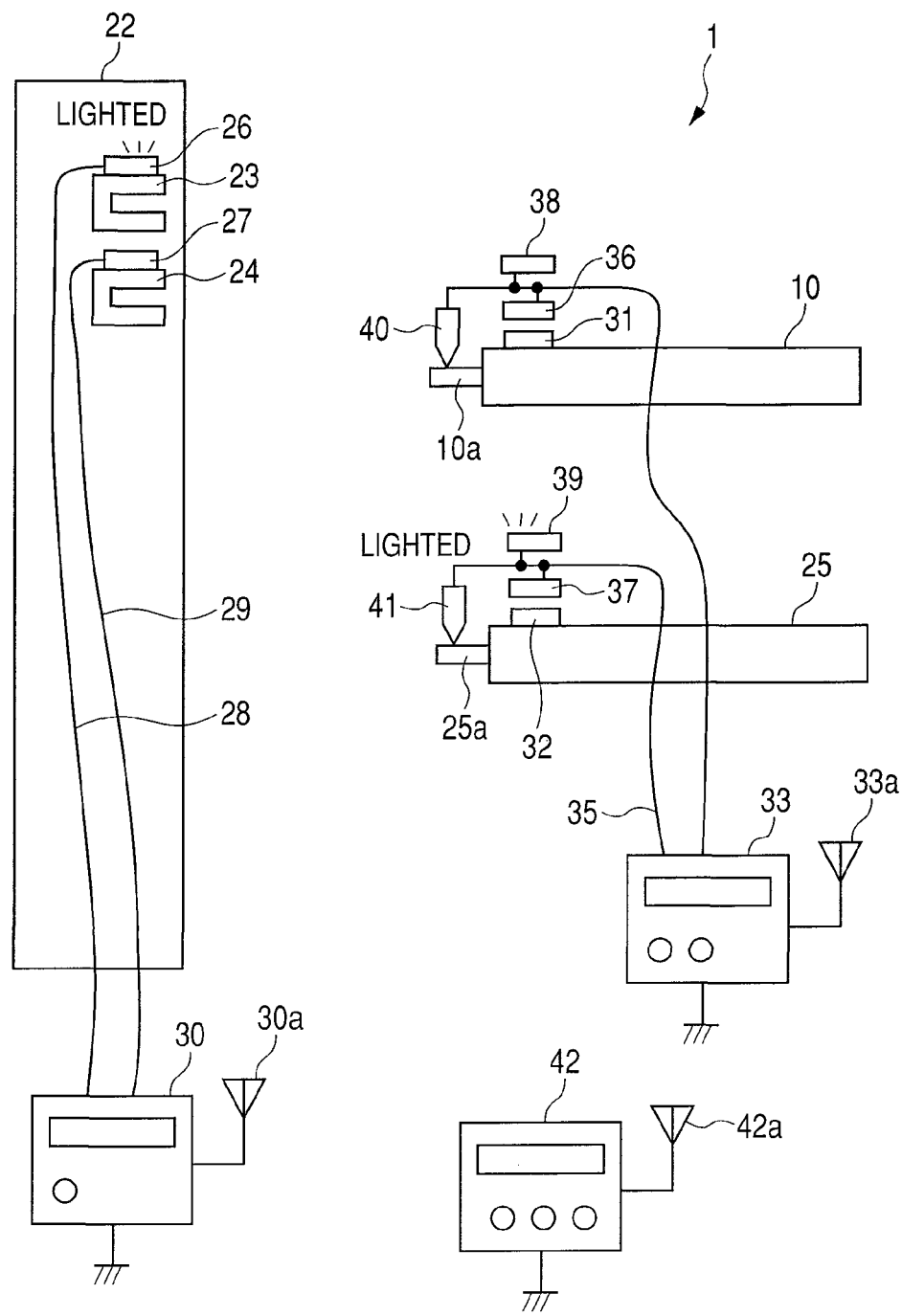
FIG. 6 is a schematic diagram showing one example of a core recognition system disclosed in a second embodiment of the invention.
Figure 7:
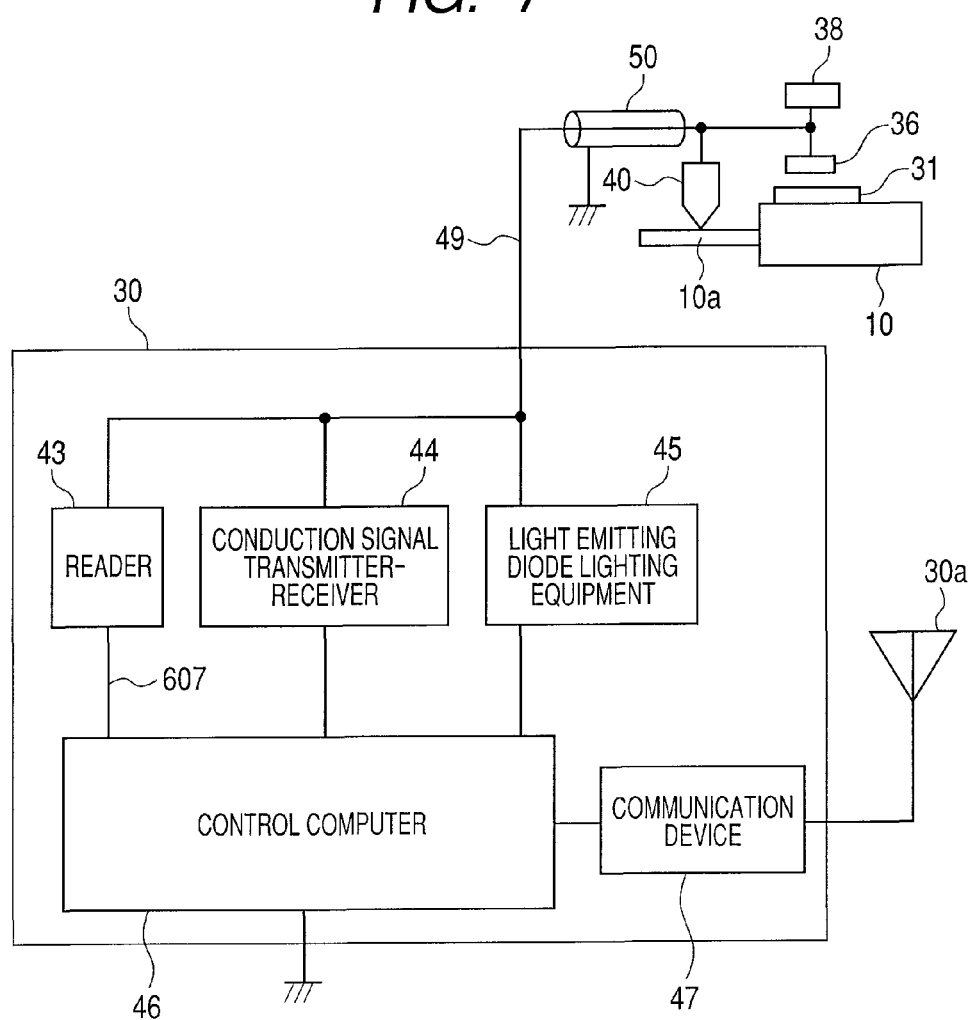
FIG. 7 is a schematic diagram showing one example of the internal configuration of a recognition unit provided to the core recognition system shown in FIG. 6.

FIG. 6 is a schematic diagram showing one example of a core recognition system disclosed in a second embodiment of the invention, FIG. 7 is a schematic diagram showing one example of the internal configuration of a recognition unit provided to the core recognition system shown in FIG. 6, and FIG. 8 is a schematic diagram showing another example of the recognition unit shown in FIG. 7.

In the first embodiment, technique for identifying the core is described, however, in the second embodiment, the core recognition system 1 that prevents an error in connection when a core is connected to a terminal block will be described.

In this case, as shown in FIG. 6, terminal blocks 23, 24 are provided to a terminal board 22. The terminal block 23 is a terminal for connecting a core 10 and the terminal block 24 is a terminal for connecting a core 25.

In the core recognition system 1, terminal block light emitting diodes 26, 27 that function as a first lamp are provided. The terminal block light emitting diode 26 is provided to the terminal block 23 and the terminal block light emitting diode 27 is provided to the terminal block 24.

These terminal block light emitting diodes 26, 27 are connected to a recognition unit 30 via connecting lines 28, 29. Each IC tag 31, 32 is attached to one end of each core 10, 25. Each antenna 36, 37, each core light emitting diode 38, 39 that functions as a second lamp and each conductor connecting terminal 40, 41 are connected to a recognition unit 33 via each connecting line 34, 35.

The conductor connecting terminal 40 is a terminal connected to a conductor 10a of the core 10 and the conductor connecting terminal 41 is a terminal connected to a conductor 25a of the core 25. The conductor connecting terminal 40 is connected to one end of the conductor 10a and the conductor connecting terminal 41 is connected to one end of the conductor 25a.

An antenna 42a is provided to a controller 42 and each antenna 30a, 33a is provided to each recognition unit 30, 33. The controller 42 controls the recognition units 30, 33 via the antennas 42a, 30a, 33a by radiocommunication.

The controller 42 controls the recognition units 30, 33 to light the arbitrary terminal block light emitting diode and the arbitrary core light emitting diode so as to show the core to be connected and the terminal block to be connected.

For example, when the connection of the terminal block 23 and the core 10 is set in the controller 42, the controller 42 makes control by radiocommunication so as to make the recognition unit 30 light the terminal block light emitting diode 26 provided to the terminal block 23, and makes control by radiocommunication so as to make the recognition unit 33 light the core light emitting diode 38.

Hereby, in the second embodiment, the accurate guidance of the core to be connected and the terminal block to be connected is made and an error in connecting the core and the terminal block can be prevented.

FIG. 7 is the schematic diagram showing one example of the internal configuration of the recognition unit 30 (33).

The recognition unit 30 (33) is configured by a reader 43, a conductance signal transmitter-receiver 44, light emitting diode lighting equipment 45, a control computer 46 and a communication device 47 as shown in FIG. 7.

The antenna 30a is connected to the communication device 47 and the communication device 47 communicates using radio technology such as Bluetooth and wireless LAN. The reader 43 reads information in the IC tag under the control of the control computer 46 and the conductance signal transmitter-receiver 44 transmits/receives a signal via the core 10.

The light emitting diode lighting equipment 45 turns on/off the core light emitting diode 38 under the control of the control computer 46. Each output of the reader 43, the conductance signal transmitter-receiver 44 and the light emitting diode lighting equipment 45 is made common and is connected to a connecting line 49 and a coaxial line 50.

The core light emitting diode 38, the conductor connecting terminal 40 and the antenna 36 are connected to the other end of the coaxial line 50. As each connection of the core 10, the IC tag 31, the core light emitting diode 38, the conductor connecting terminal 40 and the antenna 36 is similar to that in FIG. 6, the description is omitted.

As a high-frequency low-amplitude signal is transmitted from the reader 43, a low-frequency low-amplitude signal is transmitted from the conductance signal transmitter-receiver 44 and a middle-frequency high-amplitude signal is transmitted from the light emitting diode lighting equipment 45, no radio interference is caused even if they are mixed in the coaxial line 50. The recognition unit 33 also has the similar configuration to that of the recognition unit 30 shown in FIG. 7.

FIG. 8 is a schematic diagram showing another example of the recognition unit shown in FIG. 7.

In this case, as for a recognition unit 30, as shown in FIG. 8, core characteristic measurement equipment 51 is newly added to the similar configuration shown in FIG. 7 including a reader 43, a conductance signal transmitter-receiver 44, light emitting diode lighting equipment 45, a control computer 46 and a communication device 47.

The core characteristic measurement equipment 51 is connected between a connecting line 49 and a control computer 46 and measures various cores. As the other connecting configuration is similar to that shown in FIG. 7, the description is omitted.

Various measurement of characteristic impedance, a resistance value, delay time and others of a core is enabled by providing the core characteristic measurement equipment 51 in a link with remote similar measurement equipment for example. In this case, a recognition unit 33 also has the similar configuration to that of the recognition unit 30 shown in FIG. 8.

Thereby, according to the second embodiment, the identification of the core by remote control is enabled by using the controller 42, one person can make work heretofore requiring two persons and a man-hour for identifying the core can be reduced.

As the core can be correctly specified, the automation of workmanship instruction is enabled and important work though it is simple such as a conduction test can be also automated.

The invention made by this inventor has been concretely described based upon the embodiments, however, the invention is not limited to the above-mentioned embodiments, and it need hardly be said that various modifications are allowed in a range in which the various modifications do not deviate from the object.

The invention is suitable for technique for securely identifying an arbitrary core of multiple ones in a system in which multiple cores are used such as a nuclear power station, a control center and a data center.

What is claimed is:

1. A core recognition system, comprising:
   a first IC tag which is attached to one end of a core and in which arbitrary recognition information is stored;
   a first recognition unit that reads the recognition information stored in the first IC tag;
   a second IC tag which is attached to the other end of the core and in which arbitrary recognition information is stored; and
   a second recognition unit that reads the recognition information stored in the second IC tag, wherein the first recognition unit includes a first antenna that receives a radio wave from the first recognition unit and transmits it to the first IC tag and a first conductor connecting terminal electrically connected to one end of a conductor of the core, wherein the second recognition unit includes a second antenna that receives a radio wave from the second recognition unit and transmits it to the second IC tag and a second conductor connecting terminal electrically connected to the other end of the conductor of the core; and wherein the first recognition unit requests the second recognition unit to read the recognition information stored in the second IC tag via the conductor of the core, acquires the recognition information read by the second recognition unit via the conductor of the core, compares the acquired recognition information and the recognition information stored in the first IC tag and read by the first recognition unit and judges that when each recognition information coincides, the core is in a conductive state.

2. The core recognition system according to claim 1, comprising:

a controller that remotely controls the operation of the first and the second recognition units, wherein the controller controls the second recognition unit to read the recognition information stored in the second IC tag and to transmit the recognition information read by the second recognition unit to the first recognition unit via the conductor of the core and controls the first recognition unit to compare the transmitted recognition information and the recognition information stored in the first IC tag and read by the first recognition unit and to transmit a result of the comparison to the controller.

3. The core recognition system according to claim 2, wherein the communication of the first recognition unit and the second recognition unit via the conductor of the core is performed by a signal based upon a high-frequency carrier at a low-voltage level.

4. The core recognition system according to claim 2, comprising:

a first recognition lamp attached to a plurality of terminal blocks provided to a terminal board for connecting the core;

a third recognition unit that turns on or off the first recognition lamp according to a control signal; and a second recognition lamp provided corresponding to each first IC tag, wherein the first recognition unit turns on or off the second recognition lamp according to a control signal; and the controller transmits a control signal to the first and the third recognition units, remotely controls the third recognition unit to light the arbitrary first recognition lamp and remotely controls the first recognition unit to light the second recognition lamp corresponding to the core to be connected to the terminal block to which the lighted first recognition lamp is attached.

5. The core recognition system according to claim 2, wherein the first recognition unit and the second recognition unit include a core characteristic measurement equipment that measures electric characteristics of the core, and wherein the core characteristic measurement equipment measures the electric characteristics of the core and transmits a result of the measurement to the controller under the remote control of the controller.

* * * * *